United States Patent Office 3,551,283
Patented Dec. 29, 1970

3,551,283
DECORATIVE HEAT AND PRESSURE CONSOLIDATED LAMINATE HAVING ON ITS BACK MOST SURFACE A COATING OF A POLYMER OF AN ACRYLIC MONOMER HAVING CERTAIN PARAMETERS WITH RESPECT TO FILM FORMATION TEMPERATURE, TUKON HARDNESS AND TRANSITION TEMPERATURE
Larry Zorah Isaacson and Peter Bernard Kelly, Cincinnati, and William Kuno Neidinger, Columbus, Ohio, assignors to Formica Corporation, Cincinnati, Ohio, a corporation of Delaware
No Drawing. Filed Sept. 23, 1968, Ser. No. 761,799
Int. Cl. B32b *27/10, 27/30, 27/42*
U.S. Cl. 161—248
9 Claims

ABSTRACT OF THE DISCLOSURE

A decorative heat and pressure consolidated laminate comprising a decorative sheet impregnated with a noble thermosetting resin having bonded thereto a core sheet impregnated with a thermosetting phenolic resin, a core sheet having been coated on that side furthest away from said decorative sheet with an acrylic polymeric coating material having a particle size between about 0.1 and 0.4 micron, having a minimum film formation temperature between about 0° C. and 20° C., a Tukon hardness between about 0.5 and 3.0 and a transition temperature of from about −20° C. and +30° C., said coating having been applied before the heat and pressure consolidation, wherein said thermosetting resins have been converted to the thermoset state during the heat and pressure consolidation.

BACKGROUND OF THE INVENTION

Decorative laminates have been produced commercially in the United States and other countries of the world for a substantial plurality of years. These decorative laminates contain a plurality of laminae that are heat and pressure consolidated together to form a unitary structure. The surface sheet is a decorative sheet which may be a solid color or may carry a decorative design thereon such as a wood-grain print, floral designs or geometric figures, and the like. The decorative sheet is impregnated as a preliminary step with a noble thermosetting resin. A noble resin is recognized in the industry as being one which does not undergo any significant color deterioration during the consolidation step. The thermosetting resin is converted to the thermoset state during the consolidation. The decorative sheet containing the noble thermosetting resin is then superimposed over one or more core sheets which are generally kraft paper sheets that have been impregnated with a thermosetting phenolic resin. As before, the thermosetting phenolic resin is converted to the thermoset state during the consolidation step. The number of core sheets can be varied very substantially depending on the thickness of the laminate ultimately desired. When extremely thin laminates are desired, only one core sheet or possibly two core sheets are used. On the other hand, it is frequently desired to make laminates that are 1/32", 1/16" or 1/8" in thickness; or if desired, in even greater thicknesses. In order to get the thicker laminates one simply increases the total number of core sheets to three, five, seven, nine or more. If desired and particularly when the decorative sheet is a printed design, one may superimpose over the decorative sheet an overlay sheet which is generally a fine quality alpha-cellulose paper sheet impregnated with a noble thermosetting resin preferably of the same class as that used to impregnate the decorative sheet; and after the heat and pressure consolidation step is completed the overlay sheet becomes transparentized so that the decorative sheet can readily be seen through the overlay sheet. Other protective overlay sheets have also been used such as thermoplastic nonporous films. All of these laminates have in the past been capable of being bonded to a substrate such as plywood, hardboard, cement-asbestos board, particle board, and the like by the use of adhesive systems that are generically described as contact adhesives. When the contact adhesives are used, no sanding of the back is necessary and the bonding of the laminate to a substrate using the contact adhesive as the bonding medium can readily be accomplished. The contact adhesives are significantly more costly than conventional adhesives such as, ureaformaldehyde; white glues (polyvinyl acetate emulsions); hot melts (polyvinyl acetate-elastomers, polyesters); phenolic or resorcinol-formaldehyde; epoxy; asphaltic coal tar; animal glues, and the like. If it is intended to prepare the laminate for use as the surfacing layer of a substrate without using the expensive contact adhesives and instead using the much less expensive conventional adhesives, a sanding of the back most surface of the decorative laminate is required. By the back most surface, it is meant to refer to the exposed flat surface of the laminate which is furthest away from the decorative sheet. The sanding operation, however, is an expensive step in the process and adds to the cost of production. As a consequence, the saving achieved by eliminating the necessity for the use of an expensive contact adhesive is eaten up at least in part by the cost of the sanding operation. The sanding operation furthermore has an additional shortcoming in that exceedingly thin laminates where only one, two, three or four core sheets are used in combination with the decorative sheet, the ultimate laminate being prepared for use with conventional inexpensive adhesives frequently becomes damaged during the sanding operation because of its extreme thinness. This obviously results in rejects which adds to the cost of the total operation; and, therefore, renders such sanding in the long run more expensive on balance than the straight forward use of the expensive contact adhesive on the very thin laminates. The thicker laminates as a rule do not present the problem of significant damage during the sanding operation because of their thickness, but as indicated hereinabove the sanding operation nevertheless adds to the cost of production and overcomes at least in part some of the savings achieved by not having to use the expensive contact adhesives. For a considerable period of time industry has been seeking some method, approach or technique that would enable the prepartion of a decorative laminate in all thicknesses which could be used directly, without any sanding operation to bond to a substrate using conventional low-priced adhesives.

FIELD OF THE INVENTION

The present invention is in the field of decorative heat and pressure consolidated laminates carrying on the reverse side thereof (that side of the laminate furthest away from the decorative side) an adherable surface coating composition of an acrylic polymeric material which will permit the direct bonding of a laminate to a substrate without either a sanding operation or the expensive contact adhesives, but with the direct use of conventional low-priced bonding agents. The nature of this coating may be likened to a paint primer used to obtain good adhesion. The coating used in preparing the laminate of the present invention, while not used, of itself, as an adhesive, permits the laminate, of which it is a part, to be adhered to a variety of substrates using conventionally low-priced bonding agents. The coating is not sticky or tacky nor is it in the nature of a pressure sensitive adhesive; and in fact the laminates with said coating appear to be the same as similar laminates without the coating as they emerge from the laminate press. The difference lies in the fact that the laminates carrying on their reverse side the coating composition used in the present invention give strong glue bonds when glued with various conventional low cost adhesives to various substances while untreated laminates do not bond with low-priced adhesives unless they are sanded. It must be kept in mind that the coating is applied to the back most sheet in the laminate from an aqueous emulsion or other dispersion and upon drying, the assembly of the various laminae is arranged in superimposed relationship; and the total assembly is then inserted into the press and the entire assembly heat and pressure consolidated to a unitary structure.

DESCRIPTION OF THE PRIOR ART

Inasmuch as the present invention has solved a plurality of problems that have plagued the laminating industry for a plurality of years, the instant invention is deemed to be a scientific breakthrough and no prior art, which is deemed pertinent, is known to the instant inventors.

SUMMARY OF THE INVENTION

A decorative heat and pressure consolidated laminate comprising a decorative sheet impregnated with a noble thermosetting resin having bonded thereto a core sheet impregnated with a thermosetting phenolic resin, a core sheet having been coated on that side furthest away from said decorative sheet with an acrylic polymeric coating material having a particle size between about 0.1 and 0.4 micron, having a minimum film formation temperature between about 0° C. and 20° C., a Tukon hardness between about 0.5 and 3.0 and a transition temperature of from about −20° C. and +30° C., said coating having been applied before the heat and pressure consolidation, wherein said thermosetting resins have been converted to the thermoset state during the heat and pressure consolidation. Still further, this invention relates to a decorative heat and pressure consolidated laminate comprising a decorative sheet impregnated with a noble thermosetting resin having bonded thereto directly and indirectly one or more core sheets of kraft paper impregnated with a thermosetting phenolic resin, said bottom most core sheet having a coating on its exposed flat surface the adherable surface coating composition as described hereinabove and in greater detail hereinbelow. During the heat and pressure consolidating step the thermosetting resins in the decorative sheet as well as in the core sheet(s) are converted to the thermoset state.

One of the objects of the present invention is to provide an adherable surface on the back-most side of a decorative laminate so as to permit said laminate to be bonded to a substrate by the use of numerous conventional adhesives, especially low-priced adhesives such as the urea-formaldehyde resins and the "white glues" instead of the highly priced contact adhesives without the necessity of any sanding operation. This object and other objects of the present invention will be set forth in greater detail hereinbelow. The coating composition applied to the back most sheet to be used in a decorative laminate is best described as any one of a plurality of suitable acrylic emulsions of which a substantial plurality are available commercially. The monomers used to prepare these acrylic emulsions may be used either singly or in combination with one another provided that the polymeric materials produced fall within the parameters described hereinabove and in greater detail hereinbelow. In other words, one may use a homopolymeric acrylic emulsion, a copolymeric acrylic emulsion having two monomers copolymerized or other copolymers such as terpolymers and the like. Among the monomers which may be used to prepare the acrylic emulsion are methyl acrylate, ethyl acrylate, propyl acrylate, butyl acrylate, 2-ethylhexyl acrylate, methylmethacrylate, ethylmethacrylate, butyl methacrylate, hexylmethacrylate, dimethylaminoethyl methacrylate, t-butylaminoethyl methacrylate, hydroxyethyl methacrylate, hydroxypropyl methacrylate, and the like. Other polymerizable vinyl monomers may be used in combination with any of the acrylic monomers referred to hereinabove provided that the amount used is not so great as to take the transition temperature out of the range of between about −20° C. and +30° C. and preferably between about 5° C. and 25° C. Such other monomers as styrene, vinyl acetate, vinyl chloride, vinylidene chloride, acrylonitrile, and the like may be used. Most of these monomers are available commercially from a plurality of sources although some of the more recently developed monomers are available in development quantities only, at the present time.

Among the acrylic monomers that can be used as the only monomer in the homopolymer emulsion are methyl acrylate, which has a glass transition temperature of about +10° C.; n-butyl methacrylate, which has a glass transition temperature of about +20° C.; dimethylaminoethyl methacrylate, which has a glass transition temperature of about 18° C. Also propyl acrylate which has a glass transition temperature of −5° C.; cyclohexyl acrylate which has a glass transition temperature of +15° C.; n-hexyl methacrylate which has a glass transition temperature of −5° C.; 2-ethylsulfinylethyl methacrylate which has a glass transition temperature of +25° C. Some of these acrylic coating compositions are shown in the U.S. Pats. 2,790,735, 2,790,736 and 2,795,564 which patents are incorporated herein by reference.

The particle size of the polymeric material in the acrylic emulsion may be varied between about 0.1 and 0.4 micron and preferably about 0.2 micron.

The acrylic emulsions that are used in coating the back most side of the decorative laminate should have a minimum film formation temperature from about 0° C. to 20° C. and preferably between about 3° C. and 7° C. wherein the minimum film forming temperature is defined as that temperature below which a continuous film will not form.

The Tukon hardness may be varied between about 0.5 to about 3.0 and preferably between about 0.8 to about 1.8. The Tukon hardness tester, and the method by which it is used, is described fully in an instruction book published by the Wilson Mechanical Instrument Division of American Chain and Cable Company, Inc., which book is incorporated herein by reference. The glass transition temperature value frequently referred to for the sake of brevity as $T_i$ is also referred to as the inflection temperature which is found by plotting the modulus of rigidity against temperature. A convenient method for determining modulus of rigidity and transition temperature is described by I. Williamson, British Plastics 23, 87–90, 102 (September, 1950). The $T_i$ value here used is that determined at 300 kg./cm.$^2$. One of the principal commercial suppliers of acrylic monomers for use in making acrylic emulsions has prepared a chart which permits one to analyze the glass temperatures of the various monomers which chart provides glass temperatures of the various monomers and provides glass temperature factors for the various monomers depending on the percentage of the individual monomer or monomers used in the emulsion polymer. Glass temperature factors are provided for a substantial plurality of these monomers and depending on the composition of the ultimate homopolymer or terpolymer, the temperature factor shows the glass transition temperature in a conversion scale that readily enables one to select those acrylic emulsions which fall within the parameters utilized hereinabove with respect to the $T_i$ while excluding those which either have a $T_i$ that is too high or too low. The temperature factor of 3.30 gives a $T_i$ of 30, while anything less than a 3.30 temperature factor gives a glass transition temperature that is higher than 30. On the other hand a temperature factor of 3.95 will give a glass transition temperature of about −20 and any temperature factor in excess of 3.95 will give a glass transition temperature below —20 and therefore excluded.

It has been stated hereinabove that those acrylic polymers which have a glass transition temperature outside of the range of about —20° C. and about +30° C. cannot be used as the sole acrylic polymeric material. However, blends of softer acrylic polymeric materials such as those having a glass transition temperature of —30° C. or —40° C. or lower with acrylic polymeric materials having a softening temperature of +40° C. or 50° C. or higher can be used provided that the glass transition temperature of the blend falls within the range stated above. Still further, a modification that would permit the utilization of acrylic polymers having a glass transition temperature significantly above +30° C. can be utilized if some appropriate plasticizer is used therewith and thereby reducing the glass transition temperature of a level within the stated required range.

There are a number of different approaches which may be used in the coating of the back most sheet. For instance, one may take a sheet of kraft paper and impregnate it with an aqueous solution or dispersion of a thermosetting phenolic resin and after having dried the same, the back most surface may then be coated with the selected acrylic polymer emulsion. Alternatively, one may take an unimpregnated core sheet, i.e., a sheet of raw kraft paper and either impregnate said core sheet with the selected acrylic polymer emulsion or simply coat one surface only with the selected acrylic polymer emulsion.

If desired, one may introduce into the acrylic composition used in the present invention a water soluble starch such as amylose, all of the dextrines, corn starch, and a plurality of commercially available starches which are sold under various trademarks such as Koldex and Aqua-Flakes by nationally known companies; the precise composition of which is not exactly known, but which materials are not deemed to be essentially different from conventional cold water soluble starches. The amount of the starch used may be varied between about 0.1% and 5%, by weight, based on the total weight of the aqueous dispersion. It is preferred to use between about 0.5% and 2.0%, by weight, same basis. One of the preferred starches is a commercially available borated starch.

In order that the concept of the present invention may be more fully understood, the following examples are set forth in which all parts are parts by weight unless otherwise indicated.

EXAMPLE 1

A commercially available acrylic terpolymer aqueous emulsion prepared by copolymerizing about 60% of butyl acrylate, 20% of methyl methacrylate and 20% of hydroxyethyl acrylate is selected for use in coating the back most sheet of a kraft paper which had been preimpregnated with a thermosetting phenolic resin and dried. The selected acrylic emulsion had a solids content of 46%; was nonionic; had a pH of 3.0 and a viscosity at 25° C. of 550 centipoises. The particle size of the acrylic polymer in the emulsion was about 0.2 micron. The dried preimpregnated thermosetting phenolic resin kraft paper was coated with said acrylic emulsion in a conventional manner using a reverse roller coating technique and the thus coated paper was dried so as to remove substantially all of the aqueous medium present in the emulsion without advancing significantly the cure of the thermosetting phenolic resin. The acrylic polymer film thus deposited on the surface of the kraft paper was soft and had a minimum film formation of less than 0° C., had a glass transition temperature of about —14° C. and a Tukon hardness of 0.5. A laminate assembly is prepared by positioning the thus coated impregnated sheet face down in a stack onto which is superimposed seven core sheets of kraft paper preimpregnated with the same thermosetting phenolic resin as was used in the base sheet, and on top of the core sheets there is positioned a decorative sheet that had been preimpregnated with a thermosetting melamine-formaldehyde resin. Said decorative sheet having been prepared from a fine grade of alpha-cellulose paper. The assembly stack is then inserted into a conventional laminating press and is heat and pressure consolidated under standard conditions to a unitary structure. Upon removal from the press, the laminate is readily bonded to a substrate without need for any sanding operation and with the use of a conventional low cost commercially available adhesive.

EXAMPLE 2

Example 1 is repeated in all essential details except for the acrylic emulsion used and also except that only a total of two core sheets were used. The acrylic emulsion contained a terpolymer having about 45 parts of butyl acrylate, about 25 parts of methyl methacrylate, and 30 parts of hydroxyethyl methacrylate. The acrylic emulsion used had a solids content of 55%; was nonionic; had a pH of 3.0; a viscosity of 550 centipoises at 25° C. and a particle size of about 0.2 micron. The film thus produced was leathery, had a minimum film formation temperature of +5° C., had a glass transition temperature of +17° C. and a Tukon hardness of 1.4. Upon removing the coated paper from the drying oven, very mild blocking was encountered on storage; however, the laminate produced therefrom was entirely suitable for use with low-priced conventional adhesives to bond to a substrate without the need for any sanding.

EXAMPLE 3

Example 2 is repeated in all essential details except that 2% of a commercially available water soluble starch was added to the acrylic emulsion before using it to coat the back most surface of the core sheet and the blocking on storage of said sheets was eliminated.

EXAMPLE 4

Example 2 is repeated in all essential details except for the particular acrylic emulsion utilized. The acrylic polymeric material was a copolymer prepared by polymerizing about 48 parts of butyl acrylate and about 52 parts of methyl methacrylate. The emulsion had the following properties: 46–47% solids content; nonionic; pH 9.5–10; viscosity 1200 centipoises at 25° C.; and a particle size of about 0.2 micron. The film thus deposited on the backmost side of the bottom-most core sheet was leathery and had a minimum film formation of +9° C., a Tukon hardness of greater than 1.0 and a glass transition temperature of about 20° C. The laminate, upon removal from the press, was readily bonded to a substrate using a conventional adhesive without any need for sanding.

We claim:

1. A decorative heat and pressure consolidated laminate comprising a decorative sheet impregnated with a noble thermosetting resin having bonded thereto a core sheet impregnated with a thermosetting phenolic resin, a core sheet having been coated on that side furthest away from the said decorative sheet with an acrylic polymeric coating material having a particle size between about 0.1 and 0.4 micron, having a minimum film formation temperature between about 0° C. and 20° C., a Tukon hardness between about 0.5 and 3.0 and a transition temperature of from about —20° C. and 30° C., said coating having been applied before the heat and pressure consolidation, wherein said thermosetting resins have been converted to the thermoset state during the heat and pressure consolidation.

2. A laminate according to claim 1 in which the minimum film formation temperature is between about 3° C. and 7° C.

3. A laminate according to claim 1 in which the Tukon hardness is between about 0.8 and 1.8.

4. A laminate according to claim 1 in which the transition temperature is between about 5° C. and 25° C.

5. A laminate according to claim 2 in which the Tukon hardness is between about 0.8 and 1.8 and the transition temperature is between about 5° C. and 25° C.

6. A laminate according to claim 1 in which the acrylic polymeric material is a terpolymer of butyl acrylate, methyl methacrylate and hydroxyethyl acrylate.

7. A laminate according to claim 1 in which the acrylic polymeric material is a copolymer of butyl acrylate and methyl methacrylate.

8. A lamainate according to claim 1 in which the acrylic polymeric coating material contains from about 0.1% to about 5% by weight based on the total weight of the coating material of a water soluble starch.

9. The lamainate according to claim 8 in which the starch is a borated starch.

References Cited

FOREIGN PATENTS 962,869  7/1964  Great Britain _____ 161—258

JOHN T. GOOLKASIAN, Primary Examiner

L. T. KENDELL, Assistant Examiner

U.S. Cl. X.R.

161—232, 233, 251, 258